US007035903B1

(12) United States Patent
Baldonado

(10) Patent No.: US 7,035,903 B1
(45) Date of Patent: Apr. 25, 2006

(54) SYSTEMS AND METHODS FOR THE DISCOVERY AND PRESENTATION OF ELECTRONIC MESSAGES THAT ARE RELATED TO AN ELECTRONIC MESSAGE

(75) Inventor: Michelle Q. Wang Baldonado, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 572 days.

(21) Appl. No.: 09/717,298

(22) Filed: Nov. 22, 2000

(51) Int. Cl.
*G06F 15/16* (2006.01)

(52) U.S. Cl. .................................. 709/206

(58) Field of Classification Search ........ 709/205–207, 709/204, 226; 707/102, 10, 7, 3; 345/752, 345/753; 715/534, 526, 726
See application file for complete search history.

(56) References Cited

U.S. PATENT DOCUMENTS

| | | | |
|---|---|---|---|
| 5,809,232 A | | 9/1998 | Johnson et al. |
| 5,818,447 A * | | 10/1998 | Wolf et al. .................. 345/752 |
| 5,864,684 A | | 1/1999 | Nielsen |
| 5,948,058 A * | | 9/1999 | Kudoh et al. ............... 709/206 |
| 6,101,532 A * | | 8/2000 | Horibe et al. ............... 709/206 |
| 6,360,251 B1 * | | 3/2002 | Fujita et al. ................ 709/206 |
| 6,377,965 B1 * | | 4/2002 | Hachamovitch et al. .... 715/534 |
| 6,484,196 B1 * | | 11/2002 | Maurille ..................... 709/206 |
| 6,496,853 B1 * | | 12/2002 | Klein ......................... 709/206 |
| 6,571,234 B1 * | | 5/2003 | Knight et al. ................... 707/3 |
| 6,571,275 B1 * | | 5/2003 | Dong et al. ................. 709/209 |
| 6,609,138 B1 * | | 8/2003 | Merriam .................... 707/204 |
| 6,630,944 B1 * | | 10/2003 | Kakuta et al. .............. 345/758 |
| 6,631,398 B1 * | | 10/2003 | Klein ......................... 709/206 |
| 6,658,409 B1 * | | 12/2003 | Nomura et al. ................ 707/4 |

FOREIGN PATENT DOCUMENTS

| | | |
|---|---|---|
| GB | 2 324 627 A | 10/1998 |
| WO | WO 97/27534 | 7/1997 |

OTHER PUBLICATIONS

Http://www.microsoft.com/office/outlook/default.htm, Office Programs, Microsoft Outlook, p. 1 of 2, Nov. 21, 2000.

Richard K. Belew, et al. *HyperMail: Treating Electronic Mail as Literature*, pp. 48-54, Computer Science & Engr. Dept. (C-014), University of California at San Diego, San Diego, CA 92093.

Douglas E. Comer, et al., *Conversation-Based Mail*, pp 299-319, ACM Transactions on Computer Systems, vol. 4, No. 4, Nov. 1986.

Andy Cockburn, et al., *Reducing User Effort in Collaboration Support*, pp 215-218, Dept. of Computing Science, Stirling University, Stirling, Scotland, FK9 4LA, Intelligent User Interfaces '93.

Bradley J. Rhodes, *Margin Notes: Building a Contextually Aware Associative Memory*, pp 219-224, MIT Media Lab, 20 Ames Street Cambridge, MA 02139.

\* cited by examiner

*Primary Examiner*—Abdullahi Salad

(57) ABSTRACT

The systems and methods of this invention nondisruptively provide the author of an electronic message with conversationally-related messages. Initially, a background search for conversationally-related messages is performed. Next, the conversationally-related messages are made available for viewing by the author. The conversationally-related messages can be displayed in such a way that the author is not required to view any of the related messages during the composition of the new message.

29 Claims, 4 Drawing Sheets

SYSTEMS AND METHODS FOR THE DISCOVERY AND PRESENTATION OF ELECTRONIC MESSAGES THAT ARE RELATED TO AN ELECTRONIC MESSAGE

BACKGROUND OF THE INVENTION

1. Field of the Invention

This invention relates to electronic messaging systems. In particular, this invention relates to locating and presenting messages that are conversationally related to an electronic message.

2. Background of the Invention

Electronic messaging systems, such as an e-mail system or an electronic news system, allow one or more individuals to communicate with one another. In particular, a first individual will specify address information of the recipient(s) and then populate the body of the message with message content. The electronic message is then delivered to the recipient(s) for review. One or more of the recipients can then, for example, reply to the message, forward it to additional individuals, store the message, or the like. Thus, the number of e-mail messages can rapidly grow and conversations on the original topic can continue ad infinitum.

Alternatively, a recipient may not immediately respond to a received e-mail. For example, a recipient may read the e-mail, and then store it with the intention of replying at a later date. Then, at a later date, the recipient may generate a new e-mail back to the original sender. This new e-mail may, for example, include information pertinent to the original e-mail, plus, for example, supplemental conversationally related material. This e-mail is then returned to the original sender with the mutual understanding that a conversation on a particular topic had previously occurred and this e-mail was in response to, or supplemental to, the original e-mail message.

SUMMARY OF THE INVENTION

An e-mail message may represent a single event in a larger conversation and may be associated with a conversational history. However, unlike a typical face-to-face conversation, an e-mail conversation may likely take place in parallel with other conversations, and such e-mail conversations within a larger conversation are likely to be interspersed with many interruptions and distractions. Thus, the context and history of a conversation are not always fresh in the participants' minds. As a consequence, authors of electronic messages often find it valuable during a message composition to consult previous messages exchanged with the other participants in the conversation.

A number of e-mail programs make it easy for an author to see the text of the message to which they are replying. However, finding and viewing more distant messages from the conversation typically requires launching a search for those messages. Furthermore, searching is almost always necessary in cases where the author chooses to compose a new message rather than to reply to an earlier message. For example, Microsoft® Outlook® provides a facility for finding responses the user has already sent to a particular message. Specifically, if message A arrives and the user sends a response B on Jan. 1, 2000 at 10:00 a.m., then the next time the user views message A the following notice will be displayed: "You replied on Jan. 1, 2000, 10:00 a.m. Click here to find all related messages." Then, upon selecting the notice, a search is launched to retrieve messages with the same subject line in either the inbox, draft messages folder, or sent messages folder. For many users, this extra searching step is not worth the effort when replying. If the author is composing a new message, there is an extra step of locating a message from the past conversational history before the search can even be launched. The result may be that communication misunderstandings, such as when a sender forgets or incorrectly recalls a previous aspect of the conversation, or even redundant messaging, such as when a sender forgets that a topic has already been covered, may occur.

The systems and methods of this invention nondisruptively provide the author of an electronic message with conversationally-related messages. Specifically, a background search for conversationally-related messages is made, and then the results of this search are automatically presented to the author. However, while these results are presented to the author for review, the author is not required to view or otherwise interact with any of the retrieved related messages.

Aspects of the present invention relate to an electronic message management system comprising a related message determination device that determines one or more related electronic messages to a new electronic message. A message control device assembles the one or more related electronic messages and a message display device nondisruptively displays a portion of the one or more related electronic messages.

Aspects of the present invention also relate to an electronic message management method comprising determining one or more related electronic messages to a new electronic message. Next, the one or more related electronic messages are assembled and nondisruptively displayed.

Aspects of the present invention also relate to an information storage media comprising information that manages electronic messages. The information determines one or more related electronic messages to a new electronic message, assembles the one or more related electronic messages and nondisruptively displays a portion of the one or more related electronic messages.

Aspects of the present invention additionally relate to an electronic message management system comprising a data system for identifying data in electronic messages, the data system adapted to identify related electronic messages. A message control system associated with the data system is adapted to assemble the related electronic messages and an output device is adapted to nondisruptively communicate the related electronic messages.

The electronic message management systems and methods of this invention use a two operation process for nondisruptively searching and displaying conversationally-related messages. Specifically, the first operation involves finding messages having data that is conversationally related to a message in preparation. Secondly, the discovered messages are presented in a nondisruptive manner to the user. More particularly, the first operation involves detecting that a user is composing a new message and collecting pieces of information pertaining to that new message that will allow for conversationally-related messages to be discovered. For example, the destination address and the subject line could be particularly salient in discovering conversationally-related messages.

Next, the related messages must be found. This is accomplished by performing, for example, a background search over all saved electronic messages for any messages that were sent, for example, to the destination addressees, or were cc'd to the destination address, or, for example, that were received from the destination address. If the destination address is known to belong to a person with multiple addresses, the search may be, for example, extended to those addresses as well. Additionally, the search can discover items that have the same subject line as a message being composed. Furthermore, if a conversational thread includes many participants, the search can find related messages that may or may not be to or from the newly targeted recipient.

The second operation of the electronic message management system involves presenting the discovered items to the user in such a way as to be nondisruptive. One option is to assemble all of the found messages into a separate electronic message folder. Alternatively, for example, the found electronic messages can be displayed in the periphery of a display, or, for example, presented in a list of found items in a separate display, such as a graphical user interface. For each of these instances, the user is not distracted from the task at hand, i.e., composing an electronic message.

Additionally, the systems and methods of this invention can be used in conjunction with co-pending application Ser. No. 09/717,278 entitled "Systems and Methods For Performing Sender-Independent Managing of Electronic Documents" and co-pending application Ser. No. 09/717,303 entitled "System and Method for Managing a Computer-Mediated Discussion Forum," filed herewith and incorporated herein by reference in their entirety.

These and other features and advantages of this invention are described in or are apparent from the following detailed description of the embodiments of the present invention.

BRIEF DESCRIPTION OF THE DRAWINGS

The embodiments of the invention will be described in detail, with reference to the following figures wherein.

DETAILED DESCRIPTION OF THE INVENTION

By combining determining related electronic messages and nondisruptively presenting these messages to a user, a user is assisted with electronic message composition. Furthermore, by presenting to a user related electronic messages during message composition, a user is provided with background information that could allow for a richer and more accurate electronic message.

A user initiates creation of an electronic message. Once a sufficient amount of information regarding the created electronic message is present, a search is made for related electronic messages. If related electronic messages are found, these related electronic messages are grouped and displayed, for example in a unique user interface, in such a way as to be nondisruptive to the user.

Then, for example, if the user desires to research previously exchanged related messages, a user can select one or more of the related messages to review their content. A user can then complete composition of the electronic message and forward the electronic message to its intended recipients.

Figure 1:
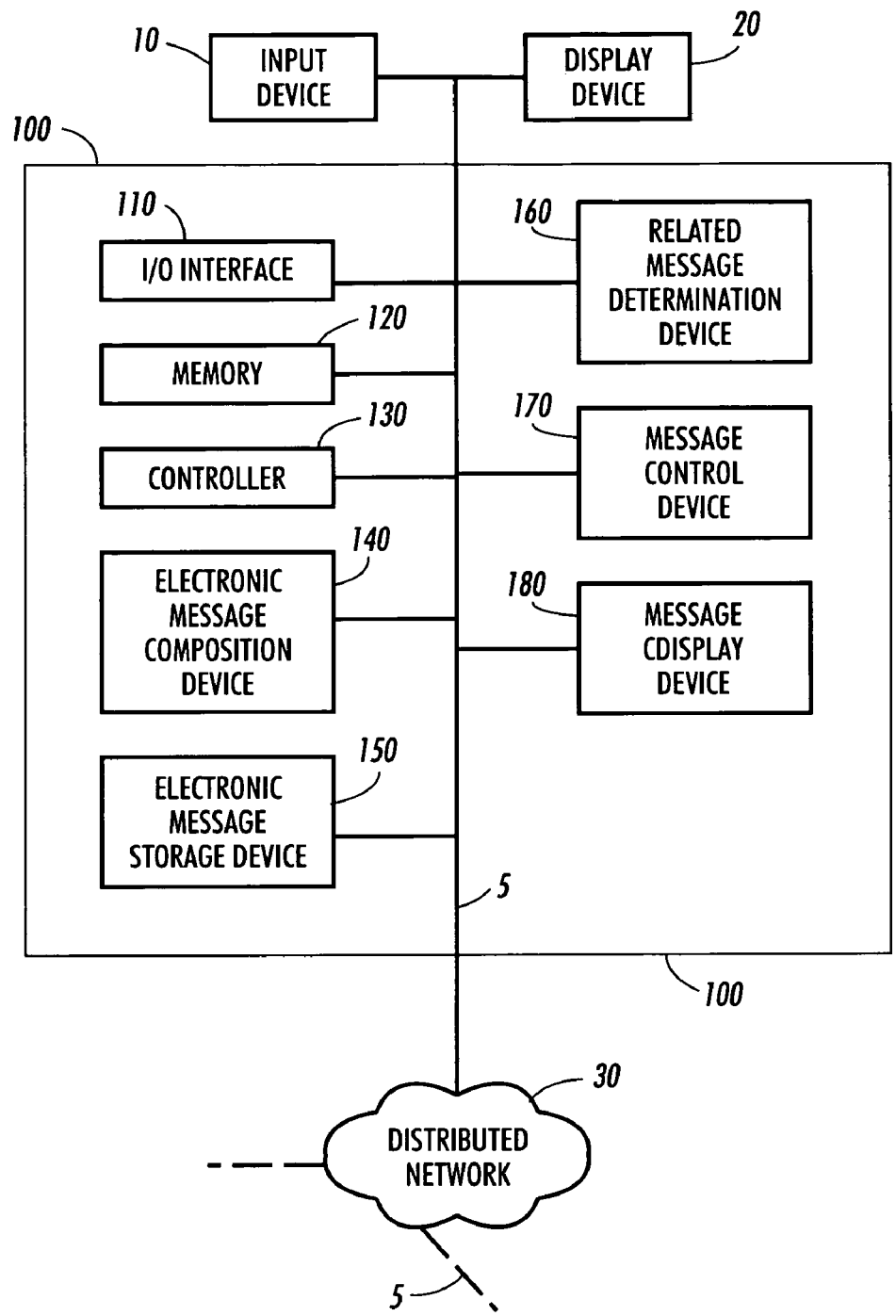
FIG. 1 is a functional block diagram illustrating an exemplary electronic message management system according to this invention.

FIG. 1 illustrates an exemplary embodiment of an electronic message management system 100. The electronic message management system 100 comprises an I/O interface 110, a memory 120, a controller 130, an electronic message composition device 140, an electronic message storage device 150, a related message determination device 160, a message control device 170 and a message display device 180, and all interconnected by link 5. The electronic message management system 100 is also connected to at least one distributed network 30 which may or may not also be connected to one or more other electronic message management systems and/or other distributed networks, as well as one or more input devices 10 and display devices 20 via link 5.

While the exemplary embodiment illustrated in FIG. 1 shows the electronic message management system 100 and associated components collocated, it is to be appreciated that the various components of the electronic message management system 100 can be located at distant portions of a distributed network, such as a local area network, a wide area network, an intranet and/or the internet, or within a dedicated electronic message management system. Thus, it should be appreciated that the components of the electronic management system 100 can be combined into one device or collated on a particular node of a distributed network. As will be appreciated from the following description, and for reasons of computational efficiency, the components of the electronic message management system 100 can be arranged at any location within a distributed network without affecting the operation of the system.

Furthermore, the links 5 can be a wired or a wireless link or any known or later developed element(s) that is capable of supplying or communicating electronic data to and from the connected elements.

In operation, the user, via input device 10, initiates the creation of an electronic message. This electronic message can be, for example, an e-mail message, a posting to an electronic bulletin board service, an annotation to a shared document, or the like, and combinations thereof. In general, the electronic message can be any document that relays information to one or more intended recipients.

The input device 10, which may be, for example, a keyboard, mouse, speech-to-text system, or the like, with the aid of the I/O interface 110, the memory 120 and the controller 130, interfaces with the electronic message composition device 140. The electronic message composition device 140 can be, for example, an e-mail system or comparable electronic message creation system.

For example, the electronic message composition device 140 can be an e-mail system and associated user interfaces. In this instance, a user could select, for example, a "Create New Mail" portion of a user interface that is shown on display device 20. Upon selection of the "Create New Mail" portion of the user interface with, for example, the click of a mouse, a new user interface is created. This new user interface can include, for example, a "to" portion, a "subject" portion and a body portion.

As the new electronic message creation process progresses, information such as recipients, subject matter, or the like is entered into the user interface, and hence the electronic message. When a predetermined amount of the information is present, the related message determination device 160 initiates a search of related electronic messages stored in the electronic message storage device 150. This search can be based on, for example, a statistical analysis, a comparison of messages, a keyword search, an address field search, a recipient search, a sender search, a subject field search, a location search, an e-mail address search, a date search, a recency search, or the like, and combinations thereof. In general, the search can be configured by the user to search stored electronic messages for any criteria.

As each related message is discovered by the related message determination device 160, the message control device 170, with the cooperation of the electronic message storage device 150, assembles a list of the related messages. Then, with the cooperation of the message display device 180, and in cooperation with the controller 130, memory 120, the I/O interface 110 and the display device 20, the message control device 170 groups and displays portions of the related electronic messages. Then, if during the composition of a new message a user desires to refer to a previously exchanged message, the user can select, for example, with a click of a mouse, one or more of the related electronic messages to view the entire message. For example, each related electronic message can be a hyperlink or other association relating the displayed portion of the related electronic message to the entire message.

If a user desires to review related messages, upon completion of this review, the electronic message being created can be completed and the electronic message composition device 140, with the aid of controller 130, the memory 120 and I/O interface 110, delivers via the links 5 and the distributed network 30, the electronic message to the intended recipients.

Figure 2:
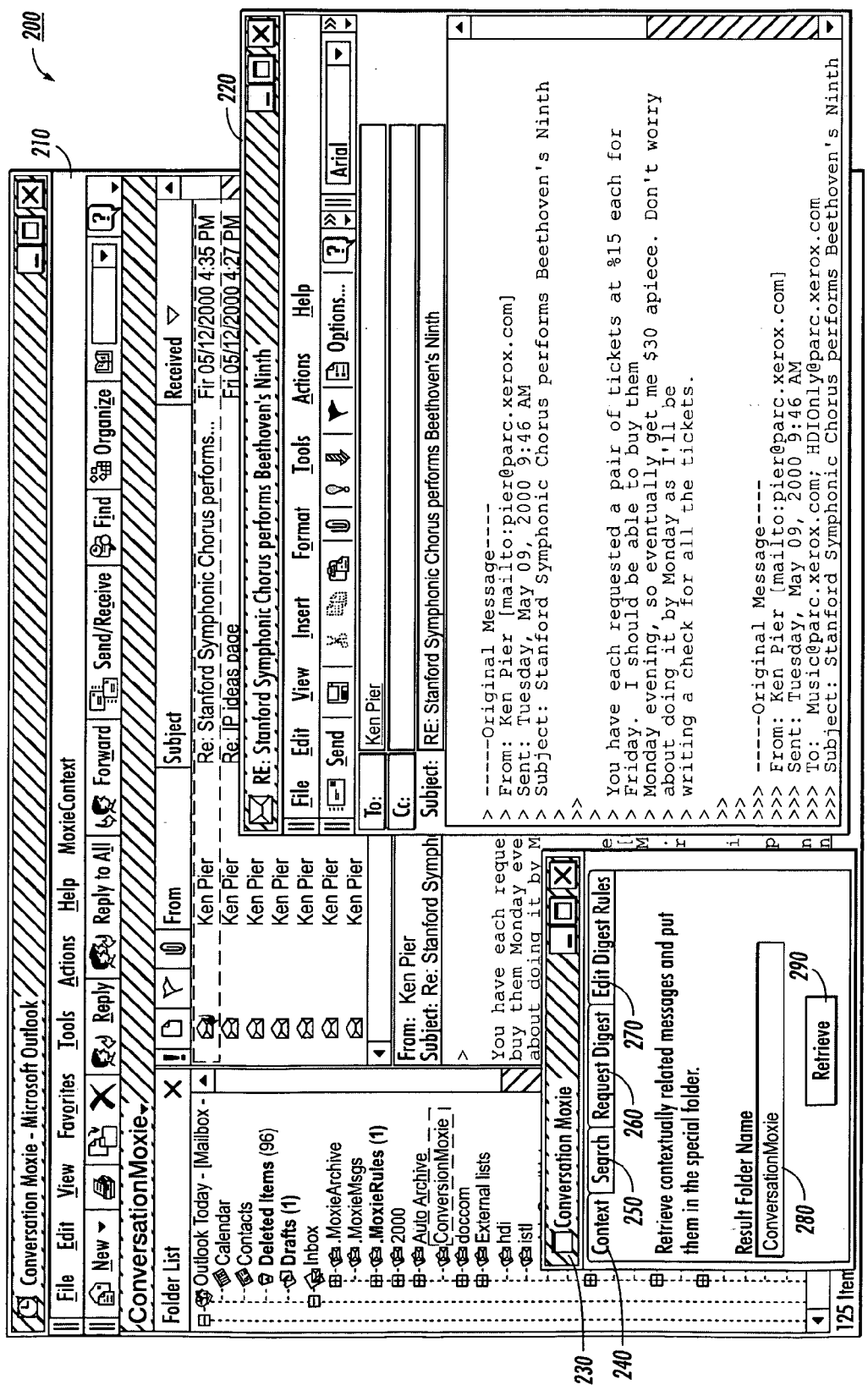
FIG. 2 is a screen shot of an exemplary user interface according to this invention.

FIG. 2 illustrates a set of exemplary user interfaces that the electronic message management system 100 may display. In particular, the exemplary user interface 200 comprises an e-mail user interface 210, a message composition user interface 220 and an electronic message management system user interface 230. The electronic message management system user interface 230 comprises a context selection portion 240, a search selection portion 250, a request digest selection portion 260, an edit digest rules portion 270, a result folder name portion 280 and a retrieve button 290.

The electronic message management system user interface 230 allows a user to control the manner in which the electronic message management system 100 operates. In particular, the electronic message management system user interface 230 allows a user to specify the rules for determining relatedness of electronic messages, and to specify routing and/or display of these related electronic messages once found. In particular, the context selection portion 240 of the electronic message management system user interface 230 allows a user to specify where the contextually related messages are to be placed or stored. The result folder name portion 280 of the electronic message management system user interface 230 specifies the location of, for example, a folder, directory, file path, user interface, or the like, where the conversationally related messages are to be placed and/or stored. The retrieve button 290 allows a user to manually search and/or retrieve the contextually related messages stored at the destination location.

The search portion 250 allows, for example, the user to specify when the search is to be initiated, or, for example, which folders or sub-folders the search should encompass. For example, the user could specify that the search is to commence upon population of the address and subject fields. Alternatively, the user could specify, for example, that the "Inbox," "Sent Mail" box and "Deleted Items" folders are to be searched for related documents.

The request digest portion 260 allows a user to specify that the results of the search are to be assembled into, for example, a digest. The composition and layout of the digest is governed by the digest rules which can be selectable and editable in the edit digest rules portion 270. For example, the digest rules may indicate, for example, a particular sort order of the messages, or that the digest should be forwarded to a predetermined location, or the like.

Figure 3:
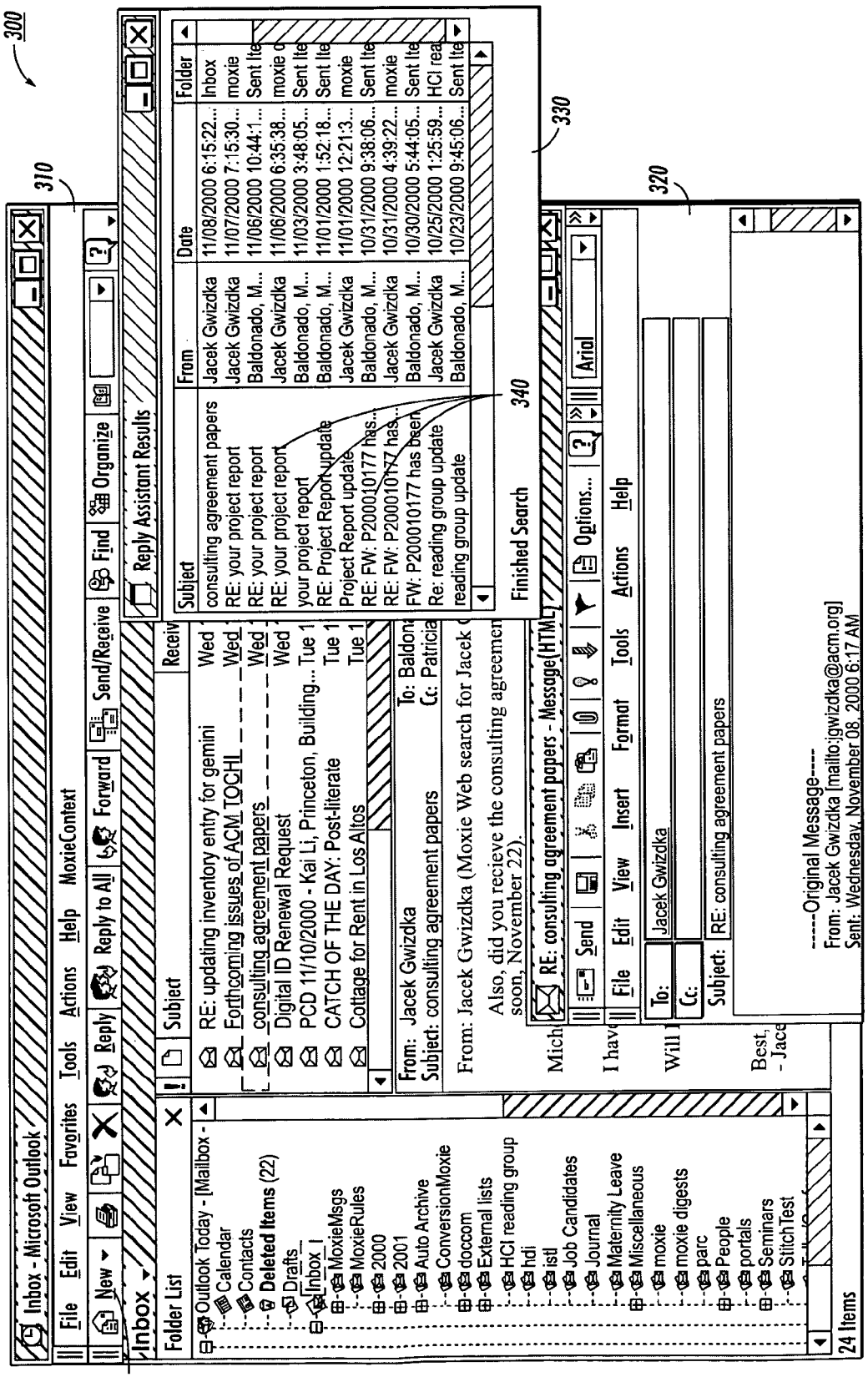
FIG. 3 is a screen shot of an exemplary user interface according to this invention.

FIG. 3 illustrates an exemplary user interface 300 that the electronic message management system 100 may display. The user interface 300 comprises an e-mail user interface 310, an e-mail creation portion 320 and a related electronic message user interface 330.

Thus, for example, a user could initially select the new button 350 to initiate creation of an electronic message. The e-mail creation portion user interface 320 would then be displayed. The e-mail creation portion user interface 320, as previously discussed, can include a "To" portion, a "Subject" portion and a body portion. Upon completion of one or more of these categories, or based on some other search criteria, the electronic message management system 100 commences determination of related electronic messages. The discovered related electronic messages are then displayed in the related electronic message user interface 330 as related electronic messages 340. Each of the related electronic messages 340 is then individually selectable to view, for example, the entirety of the related electronic message.

Figure 4:
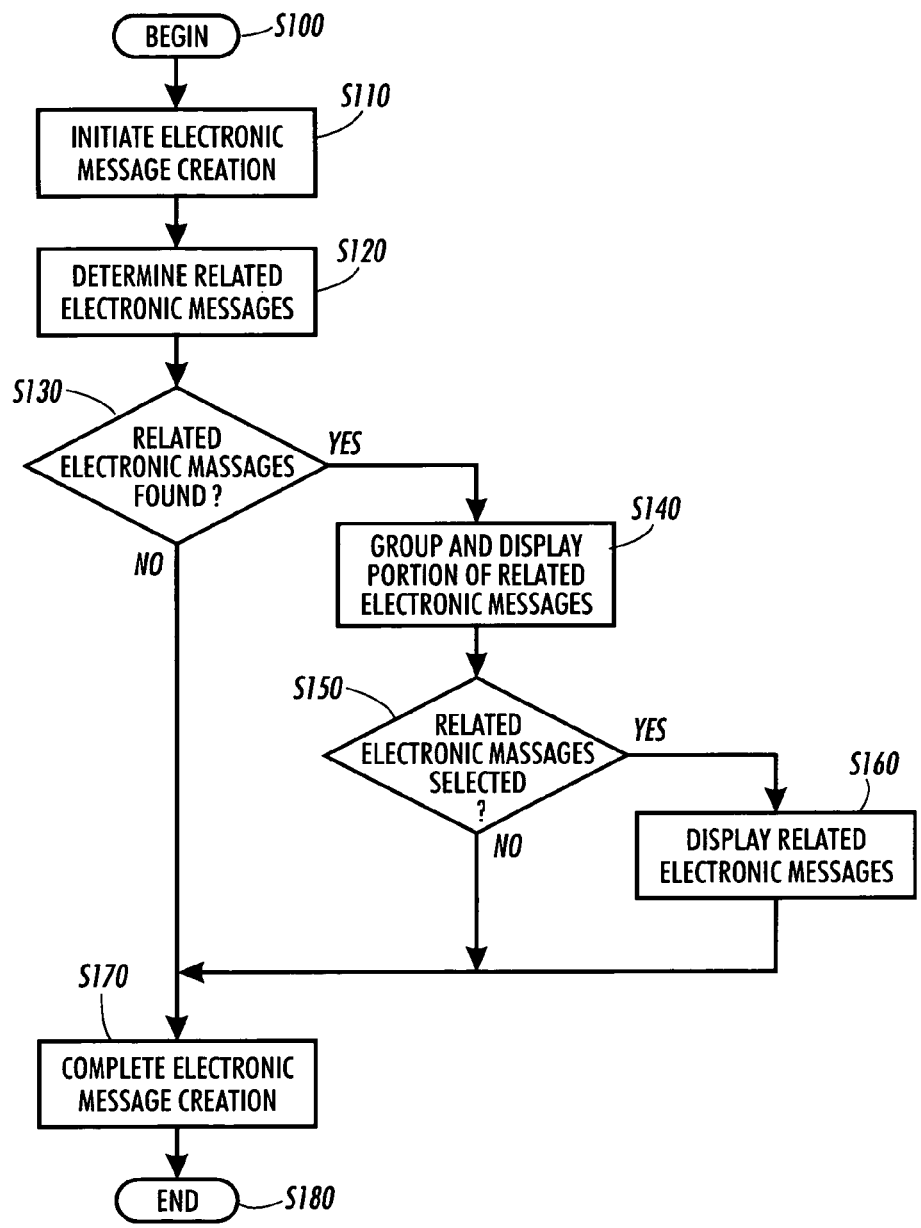
FIG. 4 is a flowchart outlining an exemplary method for managing electronic messages according to this invention.

FIG. 4 illustrates an exemplary embodiment of the operation of the electronic message management system in according to this invention. In particular, control begins at S100 and continues to S110. In S110, the electronic message creation is initiated. Next, in S120, the electronic messages related to the electronic message being created are determined. Then, in S130, a determination is made whether related electronic messages have been found. If related electronic messages have been found, control continues to S140. Otherwise, control jumps to S170.

In S140, the related electronic messages are grouped and displayed. Next, in S150, a determination is made whether one or more of the related electronic messages have been selected. If one or more of the related electronic messages have been selected, control continues to S160. Otherwise, control jumps to S170.

In S160, the related electronic messages are displayed. Control then continues to S170.

In S170, the creation of the electronic message is completed and the electronic message is forwarded to one or more recipients. Control then continues to S180 where the control sequence ends.

As illustrated in FIGS. 1–3, the electronic message management system can be implemented either on a single program general purpose computer, or a separate program general purpose computer. However, the electronic message management system can also be implemented on a special purpose computer, a programmed microprocessor or microcontroller and peripheral integrated circuit element, an ASIC or other integrated circuit, a digital signal processor, a hard wired electronic or logic circuit such as a discrete element circuit, a programmable logic device such as a PLD, PLA, FPGA, PAL, or the like. In general, any device capable of implementing a finite state machine that is in turn capable of implementing the flowchart illustrated in FIG. 4 can be used to implement the electronic message management system according to this invention.

Furthermore, the disclosed method may be readily implemented in software using object or object-oriented software development environments that provide portable source code that can be used on a variety of computer or workstation hardware platforms. Alternatively, the disclosed electronic message management system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The electronic message management systems and methods illustrated herein, however, can be readily implemented in hardware and/or software using any known or later-developed systems or structures, devices and/or software by those of ordinary skill in the applicable art from the functional description provided herein and a general basic knowledge of the computer arts.

Moreover, the disclosed methods may be readily implemented as software executed on a programmed general purpose computer, a special purpose computer, a microprocessor, or the like. In these instances, the methods and systems of this invention can be implemented as a program embedded on a personal computer such as a Java® or CGI script, as a resource residing on a server or graphics workstation, as a routine embedded in a dedicated electronic message management system, a web browser, an electronic message enabled cellular phone, a PDA, a dedicated electronic message management system, or the like. The electronic message management system can also be implemented by physically incorporating the system and method into a software and/or hardware system, such as the hardware and software systems of a dedicated electronic message management system.

For example, in an exemplary embodiment, the methods have been used in a Visual Basic® program that controls an off the shelf e-mail program. The electronic message management system of this exemplary embodiment detects when a user is issuing a reply to a message, which could be generalized to detect even when a user is composing any message, and then gathers the address and subject line information from that message. A background search is then conducted. The query used in the search is a Boolean OR with the following constraints: the existence of the recipients' names in any of the available address fields, the existence of the recipients' e-mail addresses in any available address fields, and the existence of the subject line in the subject field. Additionally, the electronic message management system functionality may be invoked explicitly by the user for any archived message. In this instance, the search takes place incrementally and results appear incrementally in, for example, a separate window. However, the user is not required to examine the contents of the separate window during message composition.

It is, therefore, apparent that there has been provided, in accordance with the present invention, systems and methods for electronic message management. While this invention has been described in conjunction with a number of embodiments thereof, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. An electronic message management system comprising:
   an electronic message composition device that detects that a new electronic message is being composed by a user;
   a related message determination device that, while the new electronic message is being composed and prior to completion, non-interactively collects information pertaining to the new electronic message as message composition progresses and continuously determines whether one or more electronic messages are related to the new electronic message based on the collected information;
   a message control device that assembles one or more of the electronic messages determined to be related to the new electronic message; and
   a message display device that nondisruptively and automatically displays a portion of the one or more related electronic messages without requiring user action to request the display.

2. The system of claim 1, further comprising:
   an electronic message composition device that allows a user to at least one of create or update the new electronic message, wherein the related message determination device non-interactively collects the information pertaining to the new electronic message as message creating or updating progresses and continuously determines whether the electronic messages are related to the new electronic message based on the collected information.

3. The system of claim 2, wherein the related message determination device automatically determines the one or more related electronic messages after commencement of the creating or updating of the new electronic message.

4. The system of claim 1, wherein upon selection of a portion of one of the one or more related messages, the related message is displayed.

5. The system of claim 1, wherein the related message determination is based on at least one of: a statistical analysis; a comparison of the new electronic message to at least one of the one or more related electronic messages; a keyword search; an address field search; a recipient search; a sender search; a subject field search; a date search; and a recency search.

6. The system of claim 1, wherein the one or more related electronic messages are at least one of: displayed in a new user interface;
   assembled into a digest; and stored.

7. The system of claim 1, wherein the related message determination device determines the one or more related electronic messages during a creation of the new electronic message and the message display device nondisruptively displays the portion of the one or more related electronic messages during the creation of the new electronic message.

8. The system of claim 1, wherein the related message determination device determines the one or more related electronic messages to the new electronic message based on one or more rules and further comprising an interface device used to enter in the one or more rules into the related message determination device prior to message composition.

9. An electronic message management method comprising:
   detecting that a new electronic message is being composed by a user;
   while the new electronic message is being composed and prior to completion, non-interactively collecting information pertaining to the new electronic message as message composition progresses and continuously determining whether one or more electronic messages are related to the new electronic message based on the collected information;
   assembling one or more of the electronic messages determined to be related to the new electronic message; and
   nondisruptively and automatically displaying a portion of the one or more related electronic messages without requiring user action to request the display.

10. The method of claim 9, further comprising:
creating or updating the new electronic message; and
non-interactively collecting the information pertaining to the new electronic message as message creating or updating progresses and continuously determining whether the electronic messages are related to the new electronic message based on the collected information.

11. The method of claim 10, wherein determining the one or more related electronic messages automatically occurs after commencement of creating or updating of the new electronic message.

12. The method of claim 9, wherein upon selection of a portion of one of the one or more related messages, the related message is displayed.

13. The method of claim 9, wherein the related message determination is based on at least one of: a statistical analysis; a comparison of the new message to at least one of the one or more related electronic messages; a keyword search; an address field search; a recipient search; a sender search; a subject field search; a date search; and a recency search.

14. The method of claim 9, wherein the one or more related electronic messages are at least one of: displayed in a new user interface; assembled into a digest; and stored.

15. The method of claim 9, wherein the determining the one or more related electronic messages is performed during a creation of the new electronic message and the nondisruptively displaying the portion of the one or more related electronic messages is during the creation of the new electronic message.

16. The method of claim 9, wherein the determining the one or more related electronic messages is performed based on one or more rules and further comprising entering the one or more rules before the determining and prior to message composition.

17. A computer readable medium having instructions stored thereon for managing electronic messages, which when executed by at least one processor, causes the processor to perform the steps of:
detecting that a new electronic message is being composed by a user;
while the new electronic message is being composed and prior to completion, non-interactively collecting information pertaining to the new electronic message as message composition progresses and continuously determining whether one or more electronic messages are related to the new electronic message based on the collected information;
assembling one or more of the electronic messages determined to be related to the new electronic message; and
nondisruptively and automatically displaying a portion of the one or more related electronic messages without requiring user action to request the display.

18. The computer readable medium of claim 17, further comprising instructions for creating or updating the new electronic message and non-interactively collecting the information pertaining to the new electronic message as message creating or updating progresses and continuously determining whether the electronic messages are related to the new electronic message based on the collected information.

19. The computer readable medium of claim 18, wherein determining the one or more related electronic messages automatically occurs after commencement of the creating or updating of the new electronic message.

20. The computer readable medium of claim 17, wherein upon selection of a portion of one of the one or more related messages, the related message is displayed.

21. The computer readable medium of claim 17, wherein the related message determination is based on at least one of: a statistical analysis; a comparison of the new electronic message and at least one of the one or more related electronic messages; a keyword search; an address field search; a recipient search; a sender search; a subject field search; a date search; and a recency search.

22. The computer readable medium of claim 17, wherein the one or more related electronic messages are at least one of: displayed in a new user interface; assembled into a digest; and stored.

23. The computer readable medium of claim 17, wherein the information that determines the one or more related electronic messages is generated during a creation of the new electronic message and the information that nondisruptively displays the portion of the one or more related electronic messages is performed during the creation of the new electronic message.

24. The computer readable medium of claim 17, wherein the information that determines the one or more related electronic messages is based on one or more rules and further comprising information for entering the one or more rules before the determining and prior to message composition.

25. An electronic message management system comprising:
a data system for non-interactively identifying data in electronic messages as message composition progresses, the data system adapted to continuously identify electronic messages related to a new electronic message based on the identified information while the new electronic message is being composed and prior to completion;
a message control system associated with the data system, the message control system adapted to assemble the related electronic messages; and
an output device adapted to nondisruptively and automatically communicate the related electronic messages without requiring user action to request the display.

26. The electronic message management system of claim 25 wherein the data system further includes a rule and the data system identifies related electronic messages according to the rule.

27. The electronic message management system of claim 25 wherein the output device communicates in at least one of a human readable and computer readable format.

28. The system of claim 25, wherein the data system identifies the electronic messages related to the new electronic message during a creation of the new electronic message and the output device nondisruptively displays the portion of the one or more related electronic messages during the creation of the new electronic message.

29. The system of claim 25, wherein the data system identifies the electronic messages related to the new electronic message based on one or more rules and further comprising an interface device used to enter in the one or more rules into the data system.

* * * * *